US010210689B1

(12) United States Patent
Cermak et al.

(10) Patent No.: US 10,210,689 B1
(45) Date of Patent: Feb. 19, 2019

(54) SYSTEM AND METHOD FOR THE TEMPORARY DEACTIVATION OF AN APPLIANCE CONTROL DEVICE

(71) Applicant: GENERAL MOTORS LLC, Detroit, MI (US)

(72) Inventors: Alexander X. Cermak, Grosse Pointe Woods, MI (US); Eric D. Neal, Clarkston, MI (US)

( * ) Notice: Subject to any disclaimer, the term of this patent is extended or adjusted under 35 U.S.C. 154(b) by 0 days.

(21) Appl. No.: 15/911,845

(22) Filed: Mar. 5, 2018

(51) Int. Cl.
*G07C 9/00* (2006.01)
*B60R 25/24* (2013.01)
*B60R 25/20* (2013.01)

(52) U.S. Cl.
CPC ...... *G07C 9/00309* (2013.01); *B60R 25/2018* (2013.01); *B60R 25/246* (2013.01); *G07C 9/00571* (2013.01); *B60R 2325/103* (2013.01); *B60R 2325/205* (2013.01); *G07C 2009/00325* (2013.01); *G07C 2009/00404* (2013.01); *G07C 2009/00539* (2013.01)

(58) Field of Classification Search
CPC .............. G07C 9/00309; G07C 9/00571
USPC ........................................ 340/5.72
See application file for complete search history.

(56) References Cited

U.S. PATENT DOCUMENTS 7,689,325 B2 * 3/2010 Farrow ............... G07C 5/008
701/2
9,352,680 B2 5/2016 Cermak
2005/0107673 A1 5/2005 Ball
2007/0216516 A1 * 9/2007 Ghabra .............. G07O 9/00182
340/5.64
2009/0096596 A1 * 4/2009 Sultan .................... G07C 5/008
340/426.13
2009/0160607 A1 6/2009 Edwards
2014/0288728 A1 * 9/2014 Tsuchida ............ G06F 11/0739
701/1

OTHER PUBLICATIONS

U.S. Appl. No. 15/403,460 titled "Method and System for Remote Modification of Information for an Appliance Activation Transmission", filed Jan. 11, 2017.

* cited by examiner

Primary Examiner — Vernal U Brown

(57) ABSTRACT

One general aspect includes a method to temporarily deactivate one or more electronics devices installed in a vehicle, the method including: (a) receiving, at a controller, a vehicle access request; (b) in response to the vehicle access request, generating, via the controller, a vehicle access command configured to unlock one or more vehicle doors; (c) in response to the vehicle access request, generating, via the controller, an electronics deactivation command configured to at least temporarily deactivate one or more vehicle electronic devices; and (d) sending the vehicle access command and electronics deactivation command to a remotely located vehicle. Other embodiments of this aspect include corresponding computer systems, apparatus, and computer programs recorded on one or more computer storage devices, each configured to perform the actions of the methods.

17 Claims, 3 Drawing Sheets

SYSTEM AND METHOD FOR THE TEMPORARY DEACTIVATION OF AN APPLIANCE CONTROL DEVICE

INTRODUCTION

Infrastructural appliances such as garage door openers, smart door locks, security gates, lighting systems, and alarms may be remotely operated from a control. This appliance remote control broadcasts an activation transmission that the appliance can recognize. An example of these remote controls are programmable garage door openers integrated into a vehicle to provide convenience. These remote controls can, however, turn into a liability in certain situations. For example, when someone requests package delivery at their vehicle, the deliverer can potentially gain access to the remote control and thus gain entry access to the requestor's home. Therefore, it is desirable to temporarily deactivate a vehicle's appliance remote control during in-vehicle deliveries.

SUMMARY

One general aspect includes a method to temporarily deactivate one or more electronics devices installed in a vehicle, the method including: (a) receiving, at a controller, a vehicle access request; (b) in response to the vehicle access request, generating, via the controller, a vehicle access command configured to unlock one or more vehicle doors; (c) in response to the vehicle access request, generating, via the controller, an electronics deactivation command configured to at least temporarily deactivate one or more vehicle electronic devices; and (d) sending the vehicle access command and electronics deactivation command to a remotely located vehicle. Other embodiments of this aspect include corresponding computer systems, apparatus, and computer programs recorded on one or more computer storage devices, each configured to perform the actions of the methods.

Implementations may include one or more of the following features. The method further including: (e) after step (d), establishing, via the vehicle, a short-range wireless connection (SRWC) connection with a key fob; and (f) reactivating, via the vehicle, the one or more vehicle electronic devices. The method where steps (e) and (f) are carried out via a telematics unit of the vehicle. The method further including: (e) in response to the vehicle access request, generating, via the controller, a vehicle access verification prompt configured to verify the authenticity of the vehicle activation request; and (f), prior to steps (b) and (c), sending the vehicle access verification prompt to a mobile computing device. The method where the vehicle access command and electronics deactivation command are sent to the vehicle via a live advisor located at a data center. The method where the one or more vehicle electronics devices includes an appliance control device. The method where the electronics deactivation command causes a telematics unit in the vehicle to transition an appliance control device from an energized state to a deenergized state. The method where the electronics deactivation command causes a telematics unit in the vehicle to mask at least one of a stored identifier information and a stored coded key information. Implementations of the described techniques may include hardware, a method or process, or computer software on a computer-accessible medium.

One general aspect includes a system to temporarily deactivate one or more electronics devices installed in a vehicle, the system including: a memory configured to include one or more executable instructions; a controller configured to execute the executable instructions; a vehicle located remotely from the controller; where the executable instructions enable the controller to: receive a vehicle access request; generate a vehicle access command in response to the vehicle access request; generate an electronics deactivation command in response to the vehicle access request; send the vehicle access command and electronics deactivation command to the vehicle; where, in response to the vehicle access command and electronics deactivation command having been received, the vehicle will both unlock one or more vehicle doors and, at least temporarily, deactivate one or more vehicle electronic devices. Other embodiments of this aspect include corresponding computer systems, apparatus, and computer programs recorded on one or more computer storage devices, each configured to perform the actions of the methods.

Implementations may include one or more of the following features. The system where: the vehicle is configured to establish a short-range wireless connection (SRWC) connection with a key fob. The system may also include the vehicle being configured to reactive the one or more vehicle electronic devices when the SRWC connection is established with the key fob after the one or more vehicle electronic devices have been deactivated in response to a received electronics deactivation command. The system where the vehicle configurations are conducted through a telematics unit. The system further including: a mobile computing device; and where the executable instructions further enable the controller to: generate a vehicle access verification prompt in response to the vehicle access request, the vehicle access verification prompt configured to verify the authenticity of the vehicle activation request; and prior to the generation of the vehicle access command and electronics deactivation command, send the vehicle access verification prompt to the mobile computing device. The system where the one or more vehicle electronics devices includes an appliance control device. The system where, in response to the electronics deactivation command having been received, a telematics unit in the vehicle will transition an appliance control device from an energized state to a deenergized state. The system where, in response to the electronics deactivation command having been received, a telematics unit in the vehicle will mask at least one of a stored identifier information and a stored coded key information. Implementations of the described techniques may include hardware, a method or process, or computer software on a computer-accessible medium.

One general aspect includes a non-transitory and machine-readable medium having stored thereon executable instructions adapted to temporarily deactivate an appliance control device of a vehicle, which when provided to a controller and executed thereby, causes the controller to: receive a vehicle access request; generate a vehicle access command configured to unlock one or more vehicle doors, in response to the vehicle access request; generate a deactivation command configured to at least temporarily deactivate the appliance control device, in response to the vehicle access request; and send the vehicle access command and deactivation command to the vehicle. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further including—generate a vehicle access verification prompt configured to verify the authenticity of the vehicle activation request via a mobile computing device, in response to the vehicle access request. The non-transitory and machine-readable memory further including—prior to generation of the vehicle access command and deactivation command, send the vehicle access verification prompt to the mobile computing device. The non-transitory and machine-readable memory where the deactivation command is further configured to allow for the subsequent reactivation of the appliance control device when a short-range wireless connection (SRWC) connection is established between the vehicle and a key fob. The non-transitory and machine-readable memory where the deactivation command is further configured to cause a telematics unit in the vehicle to transition the appliance control device from an energized state to a deenergized state. The non-transitory and machine-readable memory where the deactivation command is further configured to cause a telematics unit in the vehicle to mask at least one of a stored identifier information and a stored coded key information. Implementations of the described techniques may include hardware, a method or process, or computer software on a computer-accessible medium.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
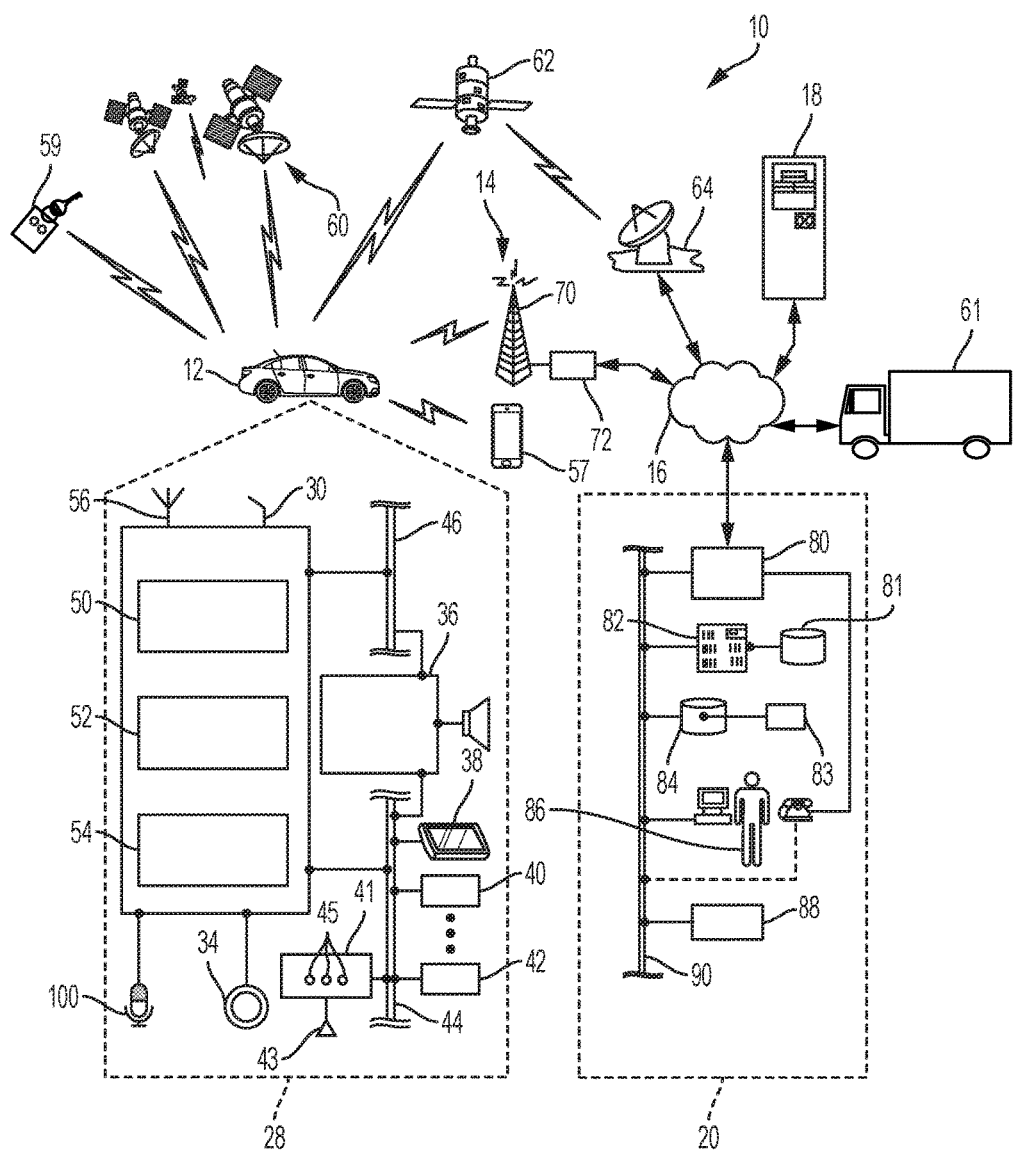
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, mobile computing device 57, wireless key fob 59, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics devices 28 are shown generally in FIG. 1 and include a telematics unit 30, a microphone 32, one or more pushbuttons or other control inputs 34, an audio system 36, a visual display 38, an appliance control device 41, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a mobile computing device 57, such as a smart phone, personal laptop computer, smart wearable device, or tablet computer having two-way communication capabilities, a netbook computer, or any suitable combinations thereof. The mobile computing device 57 can include computer processing capability, mobile memory, a transceiver capable of communicating with wireless carrier system 14, a user interface, and/or a GPS module capable of receiving GPS satellite signals and generating GPS coordinates based on those signals. The user interface may be embodied as a touch-screen graphical interface capable of user interaction as well as displaying information. Examples of the mobile computing device 57 include the iPhone™ manufactured by Apple, Inc. and the Droid™ manufactured by Motorola, Inc. as well as others. While the mobile computing device 57 may include the ability to communicate via cellular communications using the wireless carrier system 14, this is not always the case. For instance, Apple manufactures devices such as the various models of the iPad™ and iPod Touch™ that include the processing capability, user interface, and the ability to communicate over a short-range wireless communication link such as, but not limited to, WIFI and Bluetooth. However, the iPod Touch™ and some iPads™ do not have cellular communication capabilities. Even so, these and other similar devices may be used or considered a type of wireless device, such as the mobile computing device 57, for the purposes of the method described herein.

Mobile device 57 may be used inside or outside of vehicle 12, and may be coupled to the vehicle by wire or wirelessly. The mobile device also may be configured to provide services according to a subscription agreement with a third-party facility or wireless/telephone service provider. It should be appreciated that various service providers may utilize the wireless carrier system 14 and that the service provider of the telematics unit 30 may not necessarily be the same as the service provider of the mobile devices 57.

When using a short-range wireless connection (SRWC) protocol (e.g., Bluetooth/Bluetooth Low Energy or Wi-Fi), mobile computing device 57 and telematics unit 30 may pair/link one with another when within a wireless range (e.g., prior to experiencing a disconnection from the wireless network). Once SRWC is established, the devices may be considered bonded as will be appreciated by skilled artisans (i.e., they may recognize one another and/or connect automatically when they are in a predetermined proximity or range of one other. In other words—they may become, at least temporarily, network participants). Call center 20 may also authorize SRWC on an individual basis before completion.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module (BCM) that governs various electrical components located throughout the vehicle, like the vehicle's power door locks, and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, visual display 38, and programmable appliance control device 41. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Appliance control device 41 can be mounted in the vehicle interior and may be connected to telematics unit 30 via the vehicle bus 44 or via an RF transmitting device such as, but not limited to, control antenna 43. As a result, telematics unit 30 can operate one or more features of control device 41. In turn, control device 41 can operatively access features of telematics unit 30 such as, but not limited to, digital memory device 54. This control may be direct via vehicle bus 44 or antenna 43 or it may be conducted indirectly via one or more VSMs 42 (e.g., BCM).

Appliance control device 41 can communicate wirelessly with a remote-controlled appliance. Control 41 may include one or more operational switches 45 (e.g., buttons) for device operation or programming. These switches 45 may be mounted within a vehicle instrument panel, a visor, other vehicle interior areas, or they may be virtual and shown on visual display 38 (e.g., via GUI implementation). For example, control device 41 may be a Universal Garage Door Opener module (UGDO) that can be controlled through virtual prompts exhibited by the HMI module shown on virtual display 38. In this example, the remote-controlled appliance would be a Garage Door Opener (GDO) installed in a garage (discussed below). It should be understood that the HMI module is a GUI exhibited through display 38 for the purpose of enabling various control aspects of telematics unit 30.

Vehicle key fob 59 generally performs conventional remote keyless entry (RKE) functions (which can be via telematics unit 30 in conjunction with BCM 42). Moreover, the term "key fob," as used herein, broadly includes not only separate transmitters attached to a key or set of keys by a loop or tether, but also portable remote transmitters regardless of whether they are attached to keys, as well as remote transmitters that are integrated together with a vehicle key as a single component. According to one embodiment, amongst other components, key fob may include a protective housing, several user buttons, an RKE circuit, a power source, and an antenna. As is generally known of wireless key fobs 59, the user buttons enable a user to selectively activate different RKE functions at vehicle 12, including, but not limited to, locking and unlocking a door, arming and disarming a vehicle alarm system, activating a trunk release, panic signaling, remote ignition starting, and turning on interior and exterior lights. Of course, other buttons and RKE functions known in the art could also be used, including RKE functions that are performed automatically without the use of user buttons. Key fob 59 may automatically be paired/linked with telematics unit 30 via the SRWC protocol when within a wireless range. Call center 20 may also authorize SRWC pairing/linking on an individual basis before completion. Skilled artisans will understand key fob 59 may alternatively gain RKE functions via wireless communications with one or more other known electronics components in vehicle 12 (e.g., a Passive Entry/Passive Start (PEPS) module, Wireless Communications Module (WCM), etc.).

Wireless carrier system 14 is preferably a cellular telephone system that includes a plurality of cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Package delivery services provider 61 is a courier that, at least in part, specializes in the single-shipments delivery of shipping containers, parcels, or high value mail. Delivery services provider 61 can be a stand-alone company, for example, FED-EX™ and UPS™ or they may be part of/contracted by a retail provider to deliver purchased items to customers.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live advisor 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the databases 84, telematics unit 30, and mobile computing device 57.

Controller 82 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Database 84 could be designed to store information in the form of executable instructions such as, but not limited to, numerous application program interface (API) suites. Moreover, in certain instances, these API suites may be accessible to the vehicle owner (i.e., system user), data center 20, or one or more third parties. As examples, one API suite can be a delivery services suite 63 that enables a user to have packages and parcels delivered to vehicle 12 and dropped off in the interior of vehicle cabin by delivery company 61. As such, delivery company 61 may create their own personalized delivery services account to request backend services to gain temporary access to vehicle 12. Company 61 may perform tasks to create this account through a variety of frontend devices such as, for example, through computer 18 and mobile computing device 57. This delivery services account may be uploaded to or accessible on server 82 (i.e., to support backend functions). Data center 20 may also access one or more additional remote servers and/or remote databases (e.g., Department of Motor Vehicles, social media, etc.) to receive information in support of establishing the delivery services account. The owner of vehicle 12 may also verify and allow delivery company 61 access to vehicle 12.

As follows, when the vehicle owner orders items from an online retail provider such as, for example, AMAZON PRIME™ and requests package delivery to vehicle 12, the retail provider may contact the delivery services company 61 to provide the pickup location of the packaged purchased items, drop off location of vehicle 12, and request that delivery company 61 use delivery services suite 63 to gain temporary access to vehicle 12 for the package delivery. Moreover, when services company 61 uses their delivery services account to send an access request to data center 20, services suite 63 is prompted to send a command to vehicle 12 to unlock one or more of the vehicle doors (i.e., via server 82). In the alternative, upon receiving the access request, services suite 63 may prompt live advisor 86 to unlock at least one of the vehicle doors. This unlock command may moreover include time limit parameters such that the vehicle doors will unlock for a designated time period and relock at the end of the time period to discontinue access into the vehicle cabin. Delivery services suite 63 may also contact the owner of vehicle 12, for example, via mobile computing device 57 to verify the request is authentic and vehicle access is desired or services suite 63 may send a notification when vehicle entry occurs.

Furthermore, upon the sending of the unlock command, services suite 63 may also send a command or prompt live advisor 86 to temporarily deactivate one or more of the vehicle electronics such as, for example, appliance control device 41. Deactivation will render the vehicle electronics inoperable. This temporary electronics deactivation command may moreover be configured to maintain the electronics in a deactivated state until presence of key fob 59 is sensed to be in proximity of vehicle 12. In other words, when telematics unit 30 establishes an SRWC pairing/linking with key fob 59 after one or more of the vehicle electronics have been deactivated, telematics unit 30 will reactivate the electronics to their proper functionality. Telematics unit 30 may alternatively transmit a request to services suite 63 so as to prompt services suite 63/live advisor 86 to send an electronics reactivation command to vehicle 12 to reactivate the electronics. Services suite 63 may also send a command or prompt live advisor 86 to temporarily deactivated the engine of vehicle 12 in a similar manner.

Figure 2:
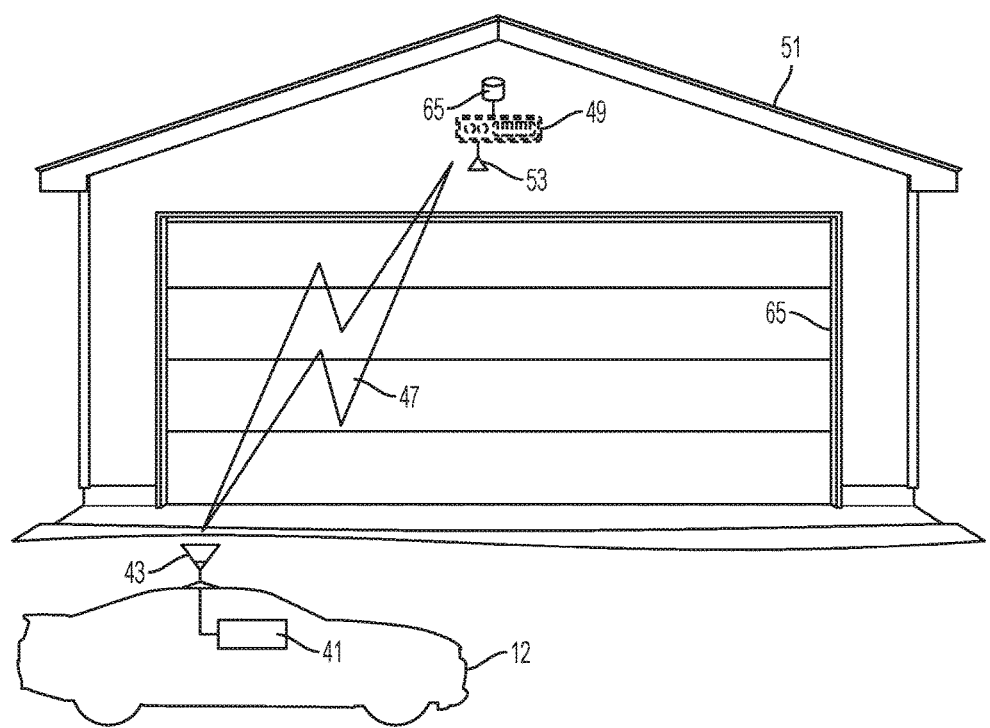
FIG. 2 is an environmental diagram illustrating an application of an exemplary appliance control according to an aspect of the system and method presented herein.

Referring now to FIG. 2, as discussed above, control device 41 allows one or more appliances 49 to be remotely controlled using control transceiver 43. In the example shown, activation transmission 47 is received by and operates a garage door opener 49 (GDO) of garage 51. Control antenna thus generates and transmits preprogrammed data in response to a user depressing an activation switch 45. A GDO receiver 53 subsequently receives the transmission 47 and, in turn, controls the GDO to open/close the garage door 65. It should be understood that appliance control 41 may also be programmed to control a wide variety of appliances 49 such as, but not limited to, mechanical barriers (e.g., gating systems), door locking systems, lighting systems (e.g., facility lighting, street or compound lighting), alarm systems, and temperature control systems.

When a user of programmable control device 41 wishes to open door 65, the user may operate control 41 to cause control transceiver 43 to generate an activation transmission 47 having data characteristics appropriate to connect with and activate GDO 49. Information transmitted in these activation transmissions 47 may be represented as binary data, which may, moreover include one or more fields such as, but not limited to, identifier information and a coded key information. The identifier information uniquely identifies control device 41 and/or control transceiver 43 and it may be a static or dynamic serial number made up of the binary equivalent of integers (e.g., 0-9) and/or characters (e.g. A-Z). The coded key information helps to prevent unwanted activation and unauthorized access of GDO 49. The identifier information and key information may be stored in digital memory device 54 and the identifier information may be further modified by telematics unit 30.

Method

Figure 3:
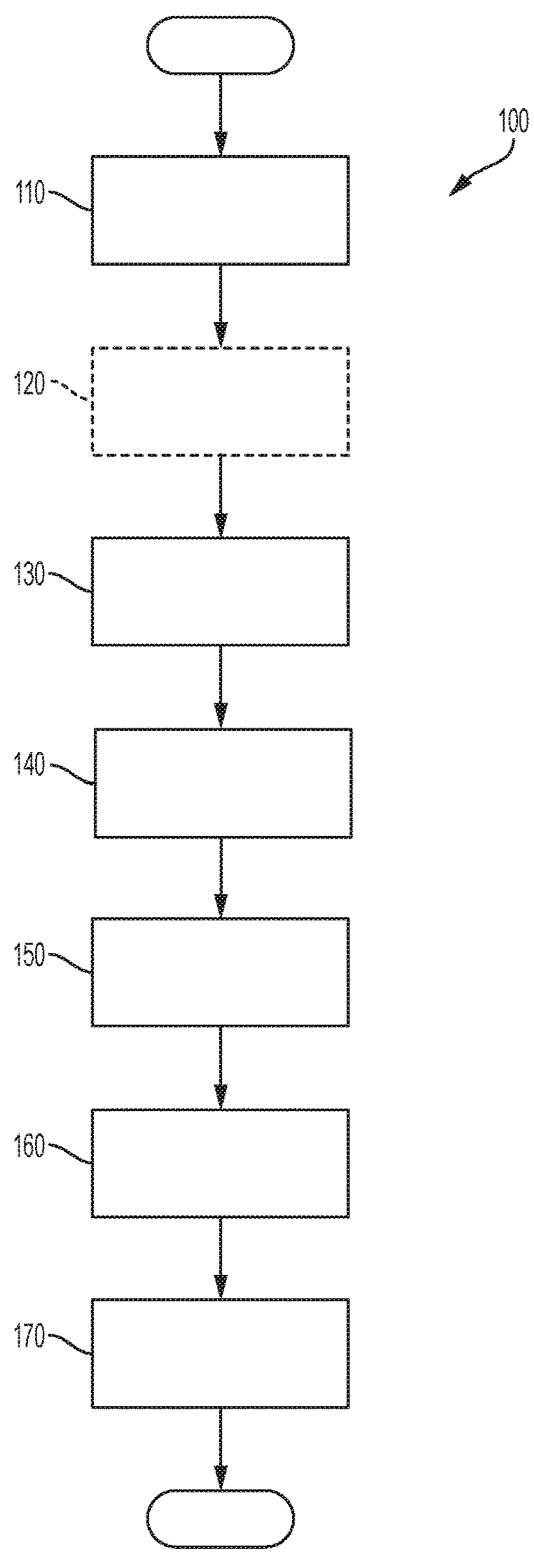
FIG. 3 is an exemplary flow according to an aspect of the method presented herein.

Now turning to FIG. 3, there is shown an embodiment of a method 100 to temporarily deactivate appliance control device 41 from data center 20. One or more aspects of deactivation method 100 may be completed through the delivery services suite 63 being implemented by server 82 of data center 20 which may include one or more executable instructions incorporated into data base 81. One or more aspects of method 100 may otherwise, for example, be completed through vehicle telematics unit 30 and mobile computing device 57. Skilled artisans will moreover see that telematics unit 30, data center 20, and mobile computing device 57 may be remotely located from each other.

Method 100 is supported by telematics unit 30 being configured to establish SRWC with vehicle key fob 59. This configuration may be made by a vehicle manufacturer at or around the time of the telematics unit's assembly or aftermarket (e.g., via vehicle download using the afore-described communication system 10 or at a time of vehicle service, just to name a couple of examples). In at least one implementation, one or more instructions are provided to the telematics unit 30 and stored on non-transitory computer-readable medium (e.g., on memory device 54). Method 100 is further supported by preconfiguring data center 20 to store the delivery services suite 63 as well as one or more other APIs in database 84, each of which being accessible via server 82. Method 100 is further yet supported by preconfiguring mobile computing device 57 to receive one or more prompts for user input.

Method 100 begins with an optional precursory step (not shown) in which a vehicle owner user establishes requests package delivery to vehicle 12 via, for example, mobile computing device 57. In this step, in response to the package delivery request, delivery company 61 will use their delivery services application account to request vehicle access via delivery services suite 63. Delivery company 61 may also make this request at the behest of a retail services provider.

In step 110, the vehicle access request is received by delivery services suite 63. In optional step 120, in response to the receiving the vehicle access request, delivery services suite 63 may generate and send a vehicle access verification prompt to the mobile computing device 57 of vehicle owner. This prompt will allow the vehicle owner the option to stop delivery services suite 63 from further processing the vehicle access request and sending any commands to vehicle 12. Skilled artisans will see the verification prompt may implemented on mobile computing device 57 through one or more graphical user interfaces displayed on a user interface of mobile computing device 57.

In step 130, in response to the receiving the vehicle access request, delivery services suite 63 will generate a vehicle access command that, when received, will cause telematics unit 30 to unlock vehicle 12 and allow the delivery company personnel to drop the package off inside the vehicle cabin 12. In step 140, also in response to the receiving the vehicle access request, delivery services suite 63 will generate a deactivation command that, when received, will cause telematics unit 30 to temporarily deactivate appliance control device 41 such that delivery company personnel cannot, for example, use application control device 41 to operate a nearby GDO 49, if any, and gain access to the home of the vehicle owner. In one or more embodiments, deactivation of appliance control device 41 occurs when telematics unit 30 removes all power being directed to application control device 41 (i.e., transitioning the device from an energized state to a deenergized state) so that the device is completely inoperable and thus cannot generate and transmit activation transmission 47. In one or more embodiments, deactivation of appliance control device 41 occurs when telematics unit 30 masks either the identifier information or coded key information (or masks both). As follows, appliance control device 41 is rendered inoperable due to GDO 49 either not being able to recognize that the activation transmission 47 emanates from appliance control device 41 or that GDO 49 would not determine the activation transmission 47 to be authorized.

In step 150, data center 20 will send the vehicle access command and electronics deactivation command to vehicle 12. In one or more embodiments, these commands may be sent via server 82. In one or more embodiments, the commands are sent to live advisor 86 as notifications to request live advisor 86 to send the commands to vehicle 12. In step 160, when the commands are received by telematics unit 30, the telematics unit 30 will unlock one or more of the vehicle's doors as well as deactivate appliance control device 41, which may be done simultaneously or in sequence. In this step, delivery company 61 may deliver package in vehicle 12 and the doors may lock after one of the doors is opened and subsequently closed. However, when time limit parameters are included in the vehicle access command, the doors may lock after a certain amount of time (regardless of whether the package is properly delivered). In step 170, likely after package delivery has taken place, when vehicle owner approaches vehicle 12 with vehicle key fob 59, telematics unit 30 will automatically pair/link with key fob 59 via the SWRC protocol. Once telematics unit and key fob 59 are properly paired/linked, telematics unit 30 will reactivate appliance control device 41 (by either unmasking the identifier information and/or coded key information or directing power back to the device). In one or more embodiments, telematics unit 30 may otherwise request data center 20 reactivate appliance control device 41 (which may occur via delivery services suite 63 or via live advisor 86). Method 100 will then move to completion.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to temporarily deactivate one or more electronics devices installed in a vehicle, the method comprising:
    (a) receiving, at a controller, a vehicle access request;
    (b) in response to the vehicle access request, generating, via the controller, a vehicle access command configured to unlock one or more vehicle doors;
    (c) in response to the vehicle access request, generating, via the controller, an electronics deactivation command configured to at least temporarily deactivate one or more vehicle electronic devices;
    (d) sending the vehicle access command and electronics deactivation command to a remotely located vehicle;
    (e) after step (d), establishing, via the vehicle, a short-range wireless connection (SRWC) with a key fob; and
    (f) reactivating, via the vehicle, the one or more vehicle electronic devices.

2. The method of claim 1, wherein the steps (c) and (f) are carried out via a telematics unit of the vehicle.

3. The method of claim 1, further comprising:
    (e) in response to the vehicle access request, generating, via the controller, a vehicle access verification prompt configured to verify the authenticity of the vehicle activation request; and (f) prior to steps (b) and (c) sending the vehicle access verification prompt to a mobile computing device.

4. The method of claim 1, wherein the vehicle access command and electronics deactivation command are sent to the vehicle via a live advisor located at a data center.

5. The method of claim 1, wherein the one or more vehicle electronics devices includes an appliance control device.

6. The method of claim 1, wherein the electronics deactivation command causes a telematics unit in the vehicle to transition an appliance control device from an energized state to a deenergized state.

7. The method of claim 1, wherein the electronics deactivation command causes a telematics unit in the vehicle to mask at least one of a stored identifier information and a stored coded key information.

8. A system to temporarily deactivate one or more electronics devices installed in a vehicle, the system comprising:
    a memory configured to comprise one or more executable instructions;
    a controller configured to execute the executable instructions;
    a vehicle located remotely from the controller;
    wherein the executable instructions enable the controller to:
        receive a vehicle access request;
        generate a vehicle access command in response to the vehicle access request;
        generate an electronics deactivation command in response to the vehicle access request;
        send the vehicle access command and electronics deactivation command to the vehicle;
    wherein, in response to the vehicle access command and electronics deactivation command having been received, the vehicle will both unlock one or more vehicle doors and, at least temporarily, deactivate one or more vehicle electronic devices;
    the vehicle is configured to establish a short-range wireless connection (SRWC) with a key fob; and
    the vehicle is configured to reactive the one or more vehicle electronic devices when the SRWC connection is established with the key fob after the one or more vehicle electronic devices have been deactivated in response to a received electronics deactivation command.

9. The system of claim 8 wherein the vehicle configurations are conducted through a telematics unit.

10. The system of claim 8, further comprising:
    a mobile computing device; and
    wherein the executable instructions further enable the controller to:
        generate a vehicle access verification prompt in response to the vehicle access request, the vehicle access verification prompt configured to verify the authenticity of the vehicle activation request; and
        prior to the generation of the vehicle access command and electronics deactivation command, send the vehicle access verification prompt to the mobile computing device.

11. The system of claim 8, wherein the one or more vehicle electronics devices includes an appliance control device.

12. The system of claim 8, wherein, in response to the electronics deactivation command having been received, a telematics unit in the vehicle will transition an appliance control device from an energized state to a deenergized state.

13. The system of claim 8, wherein, in response to the electronics deactivation command having been received, a telematics unit in the vehicle will mask at least one of a stored identifier information and a stored coded key information.

14. A non-transitory and machine-readable medium having stored thereon executable instructions adapted to temporarily deactivate an appliance control device of a vehicle, which when provided to a controller and executed thereby, causes the controller to:
    receive a vehicle access request;
    generate a vehicle access command configured to unlock one or more vehicle doors, in response to the vehicle access request;
    generate a deactivation command configured to at least temporarily deactivate the appliance control device, in response to the vehicle access request;
    send the vehicle access command and deactivation command to the vehicle; and
    wherein the deactivation command is further configured to allow for the subsequent reactivation of the appliance control device when a short-range wireless connection (SRWC) is established between the vehicle and a key fob.

15. The non-transitory and machine-readable memory of claim 14, further comprising:
    generate a vehicle access verification prompt configured to verify the authenticity of the vehicle activation request via a mobile computing device, in response to the vehicle access request; and
    prior to generation of the vehicle access command and deactivation command, send the vehicle access verification prompt to the mobile computing device.

16. The non-transitory and machine-readable memory of claim 14, wherein the deactivation command is further configured to cause a telematics unit in the vehicle to transition the appliance control device from an energized state to a deenergized state.

17. The non-transitory and machine-readable memory of claim 14, wherein the deactivation command is further configured to cause a telematics unit in the vehicle to mask at least one of a stored identifier information and a stored coded key information.

\* \* \* \* \*